(12) United States Patent
Nishida et al.

(10) Patent No.: US 8,232,930 B2
(45) Date of Patent: Jul. 31, 2012

(54) DISPLAY APPARATUS, WIRELESS TRANSMITTING AND RECEIVING SYSTEM, DISPLAY METHOD, DISPLAY CONTROL PROGRAM, AND RECORDING MEDIUM

(75) Inventors: Shinichi Nishida, Yaita (JP); Yuhsuke Iwamoto, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 1098 days.

(21) Appl. No.: 10/589,024

(22) PCT Filed: Feb. 10, 2005

(86) PCT No.: PCT/JP2005/002052
§ 371 (c)(1),
(2), (4) Date: Aug. 10, 2006

(87) PCT Pub. No.: WO2005/078943
PCT Pub. Date: Aug. 25, 2005

(65) Prior Publication Data
US 2007/0182726 A1     Aug. 9, 2007

(30) Foreign Application Priority Data
Feb. 13, 2004   (JP) .................................. 2004-037221

(51) Int. Cl.
G09G 5/00 (2006.01)
G06F 15/16 (2006.01)

(52) U.S. Cl. ......... 345/2.3; 709/217; 709/218; 709/219; 345/2.1; 345/2.2

(58) Field of Classification Search ............ 345/2.1–2.3; 709/217–219
See application file for complete search history.

(56) References Cited

U.S. PATENT DOCUMENTS

| 6,131,046 A | 10/2000 | Sano et al. |
| 6,798,459 B1 | 9/2004 | Izumi |
| 6,867,688 B2 * | 3/2005 | Lamb ...................... 340/286.02 |
| 2002/0018057 A1 | 2/2002 | Sano |
| 2003/0120742 A1 | 6/2003 | Ohgami et al. |

FOREIGN PATENT DOCUMENTS

| EP | 1 326 382 A1 | 7/2003 |
| GB | 1 393 556 | 5/1975 |

(Continued)

*Primary Examiner* — Srilakshmi K Kumar
(74) *Attorney, Agent, or Firm* — Birch, Stewart, Kolasch & Birch, LLP (57) ABSTRACT

A display apparatus of the present invention has been made so that: in cases where a video signal cannot be normally received, the display apparatus allows a display representing whether a video signal is not normally received due to presence of other wireless communication apparatus. The displaying is carried out when the video signal is not normally carried out. That is, the display apparatus of the present invention is a display apparatus for wirelessly receiving at least (i) a recognition information signal for determining whether or not the display apparatus is identified with a wireless transmitting apparatus and (ii) a video signal, the display apparatus, including: display means (12) for carrying out a display in accordance with at least the video signal; wireless receiving means (9) for receiving at least the recognition information signal and the video signal each transmitted wirelessly; recognition information signal detection means (15) for detecting the recognition information signal of the signals received by the wireless receiving means (9); and display control means (15) for outputting a signal causing the display means (12) to display display information which indicates that it is not possible to receive a signal and whose display format is changed according to the recognition information signal detected by the recognition information signal detection means (15).

12 Claims, 6 Drawing Sheets

FOREIGN PATENT DOCUMENTS

| | | | |
|---|---|---|---|
| GB | 2 343 334 A | 5/2000 |
| GB | 2 352 589 A | 1/2001 |
| JP | 04-352519 A | 12/1992 |
| JP | 9191495 A | 7/1997 |
| JP | 2001-78168 A | 3/2001 |
| JP | 2001-189947 A | 7/2001 |
| JP | 2001-196959 A | 7/2001 |
| JP | 2001-274708 A | 10/2001 |
| JP | 2002-135745 A | 5/2002 |
| JP | 2004-013697 A | 1/2004 |
| JP | 2004-015639 A | 1/2004 |
| KR | 2003-0058118 A | 7/2003 |
| WO | WO-02/23819 A2 | 3/2002 |

* cited by examiner

DISPLAY APPARATUS, WIRELESS TRANSMITTING AND RECEIVING SYSTEM, DISPLAY METHOD, DISPLAY CONTROL PROGRAM, AND RECORDING MEDIUM

TECHNICAL FIELD

The present invention relates to a display apparatus, a wireless transmitting and receiving system, a display method, a display control program, and a recording medium, in which or by which a video signal is transmitted and received by using wireless communications such as a wireless LAN.

BACKGROUND ART

Recently, a display apparatus and a transmitting and receiving system have been developed each of which receives a wirelessly transmitted video signal and which displays an image that is based on the video signal. However, in cases where a radio wave is not normally received, an image may deteriorate in quality or may not be displayed at all. Such an image causes a viewer to feel uncomfortable. In light of this, a display apparatus is known which does not display an image whose quality is significantly deteriorated but which displays an image containing information indicating that the image is not receivable (Patent Document 1: Japanese Unexamined Patent Publication No. 352519/1992 (Tokukaihei 4-352519).

However, the display apparatus described in Patent Document 1 is arranged as follows. That is, the display apparatus compares a signal level of a received video signal with a predetermined level. When the signal level is less than the predetermined level, the display apparatus does not display the image that is based on the received video signal, but displays the image containing the information indicating that the image is not receivable. Incidentally, there are various reasons why the video signal cannot be normally received. The video signal cannot be normally received, for example, when a jamming radio wave or a different wireless communication device is present, or when the display apparatus is out of a communication range. In any case, the display apparatus of Patent Document 1 invariably displays the image containing the information indicating that the image is not receivable. This allows the viewer to know that the image is not receivable. However, the viewer does not know a reason why the image is not receivable. This made it impossible for a viewer to consider and find a way of dealing with a case where the image is not receivable the term "jamming" does not refer to intentional interference with respect to a certain device, but refers to radio interference with another device using the same frequency.

DISCLOSURE OF INVENTION

The present invention has been made in view of the foregoing problems, and it is an object of the present invention to provide a display apparatus, a wireless transmitting and receiving system, a display method, a display control program, and a recording medium, each of which allows a display representing whether a video signal is not normally received due to presence of other wireless communication apparatus. The displaying is carried out when the video signal is not normally carried out.

That is, a display apparatus of the present invention is a display apparatus for wirelessly receiving at least (i) a recognition information signal for determining whether or not the display apparatus is identified with a wireless transmitting apparatus and (ii) a video signal; the display apparatus, including: display means for carrying out a display in accordance with at least the video signal; wireless receiving means for receiving at least the recognition information signal and the video signal each transmitted wirelessly; recognition information signal detection means for detecting the recognition information signal of the signals received by the wireless receiving means; and display control means for outputting a signal causing the display means to display display information which indicates that it is not possible to receive a signal and whose display format is changed according to the recognition information signal detected by the recognition information signal detection means.

With this, in cases where the video signal cannot be normally received, it becomes possible to display the information indicating whether the video signal cannot be normally received due to the presence of the other wireless communication device. With this, one can easily recognize a reason why it is not possible to receive the signal.

BEST MODE FOR CARRYING OUT THE INVENTION

The following explains an embodiment of the present invention. Note that the present invention is not limited to the embodiment.

Figure 2:
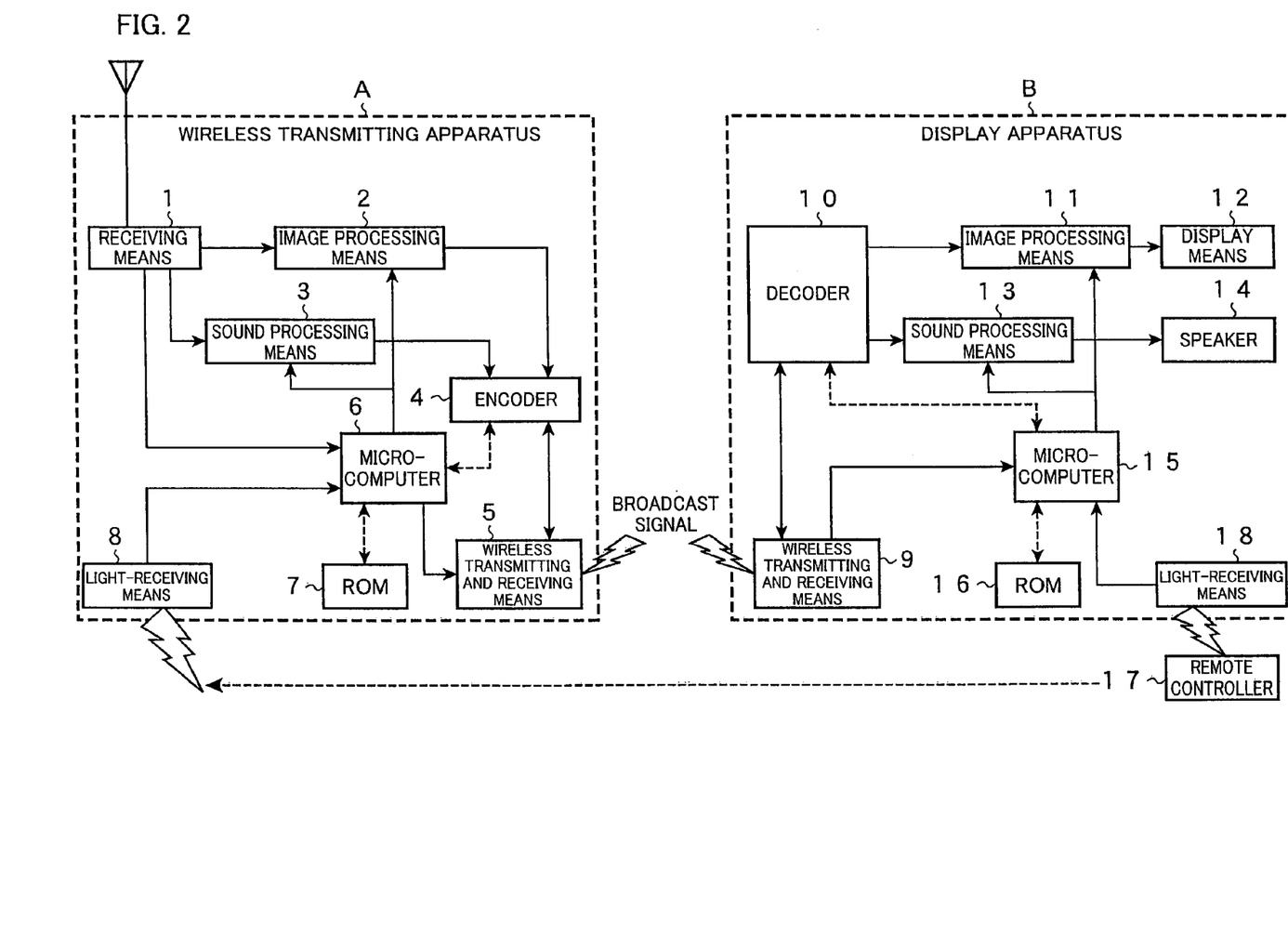
FIG. 2 is a block diagram showing a wireless transmitting and receiving system according to the embodiment of the present invention.

FIG. 2 is a block diagram showing a wireless transmitting and receiving system according to the embodiment of the present invention. That is, as shown in FIG. 2, the wireless transmitting and receiving system includes a wireless transmitting apparatus A and a display apparatus B.

The wireless transmitting apparatus A includes: receiving means 1, which receives a broadcast signal; image processing means 2, which processes a video signal contained in the broadcast signal received by the receiving means 1; sound processing means 3, which processes an audio signal contained in the broadcast signal received by the receiving means 1; an encoder 4, which compresses the audio and video signals respectively processed by the image processing means 2 and the sound processing means 3; wireless transmitting and receiving means 5, which superimposes, onto a signal having a predetermined carrier frequency, the video and audio signals compressed by the encoder 4, and which transmits the signal thus superimposed to the display apparatus B; a microcomputer 6 for carrying out these processes appropriately; and a ROM 7 for storing various set values and the like. The wireless transmitting apparatus A may further include light-receiving means 8 for receiving a predetermined signal from a remote controller (remote-control apparatus) 17. The light-receiving means 8 serves as means for changing, via the microcomputer 6, the set values stored in the ROM 7. Note that the receiving means 1 can receive not only a broadcast signal but also a video signal externally supplied or the like (not shown).

The display apparatus B includes: wireless transmitting and receiving means 9, which receives a signal transmitted from the wireless transmitting and receiving means 5 of the wireless transmitting apparatus A; a decoder 10, which decodes the signals contained in the superimposed signal received by the wireless transmitting and receiving means 9; image processing means 11, which processes the video signal decoded by the decoder 10; display means 12, which displays an image processed by the image processing means 11; sound processing means 13, which processes the audio signal decoded by the decoder 10; a speaker 14, which outputs a sound processed by the sound processing means 13; a microcomputer 15 for carrying out these processes appropriately; and a ROM 16 for storing various set values and the like. The display apparatus B further includes light-receiving means 18 for receiving a predetermined signal from the remote controller 17. The light-receiving means 18 serves as means for changing, via the microcomputer 15, the set values stored in the ROM 16. With this, various control operations can be carried out.

According to the above arrangement, the wireless transmitting apparatus A is provided with the light-receiving means 8. Alternatively, the following arrangement may be possible. Specifically, in the arrangement, the signal transmitted from the remote controller 17 is wirelessly transmitted from the wireless transmitting and receiving means 9 to the wireless transmitting apparatus A, via the light-receiving means 18 and microcomputer 15 of the display apparatus B, so as to be transmitted to the microcomputer 6. This arrangement can make it unnecessary for the wireless transmitting apparatus A to be provided with the light-receiving means 8.

In the present invention, the wireless communication can adopt a communication method defined, for example, by the IEEE 802.11b, which is an international wireless LAN standard. The IEEE 802.11b uses a 2.4 GHz frequency band (ranging approximately from 2.4 GHz to 2.5 GHz), and it is possible to use a recognition information signal for enabling connection to a specific destination. Such a recognition information signal is called an SSID. According to the SSID, the same recognition information signal is set between a transmitting section and a receiving section. This allows the receiving section to receive a signal from the transmitting section which transmits the recognition information signal thus set.

Note that it is possible to adopt other wireless communication method provided that it can use a recognition information signal other than that used in the SSID.

Examples of such other wireless communication method include the IEEE 802.11g (up to 50 Mbps), which uses the same 2.4 GHz band as the IEEE 802.11b (up to 11 Mbps) and which allows faster communication than does the IEEE 802.11b. Examples of a wireless communication method using another frequency band include the IEEE 802.11a, which uses a 5.2 GHz band as a communication frequency band. Examples of a further wireless communication methods includes: the HiSWAN, which uses the 5.2 GHz band; and the Bluetooth, in commercial products such as a PC, which uses a 2.45 GHz band, and a communication speed of 1 Mbps to 2 Mbps. The present invention can be applied to each of these communication standards. In this case, it is possible to achieve the same effects when a jamming radio wave transmitted from a different electronic device using the same communication band is detected.

In the display apparatus B, for example, the microcomputer 15 detects a level, disorder, or the like of the received video signal, and determines whether or not the display apparatus B is in a poor signal reception state in which normal reception is not carried out. Furthermore, the microcomputer 15 detects a received recognition information signal, and determines whether or not the detected recognition information signal is identical to a recognition information signal set in the ROM 16 or the like. Therefore, in cases where the microcomputer 15 determines that the detected recognition information signal is different from the set recognition information signal, it is possible to recognize that a jamming radio wave is generated due to the presence of a different communication device transmitting the different recognition information signal. Further, display information, such as a character pattern, which indicates that it is not possible to receive any signal is stored in storage means such as the ROM 16, and the microcomputer 15 controls so that one of a plurality of poor reception information is displayed, which information is based on the stored display information.

Figure 1:
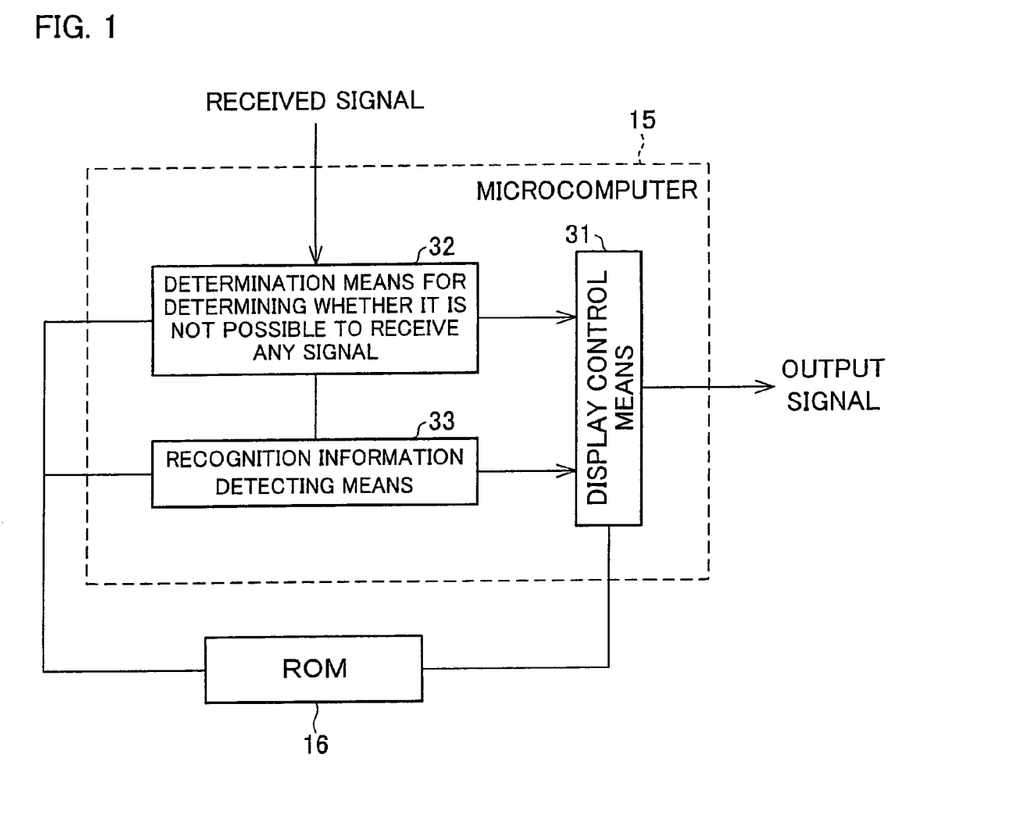
FIG. 1 is a block diagram schematically showing a microcomputer provided in a display apparatus according to an embodiment of the present invention.

That is, as shown in FIG. 1, the microcomputer 15 includes display control means 31 for generating an output signal for carrying out display control with respect to the image processing means 11. The display control means 31 outputs various display control signals in accordance with signals transmitted from (i) determination means 32 for determining whether it is not possible to receive any signal and (ii) recognition information detecting means 33, which means 32 and 33 are provided in the microcomputer 15.

The determination means 32 detects the level, disorder, or the like of the received video signal, and determines whether or not the display apparatus B is in the poor signal reception state in which normal reception is not carried out. The determination is carried out using a threshold value of the signal level prestored in the ROM 16, for example. That is, the determination means 32 determines whether or not a received signal has a signal level greater than the threshold value of the signal level stored in the ROM 16. In cases where the signal level of the received video signal is not greater than the signal level threshold value, the determination means 32 determines that it is not possible to receive any signal. Then, the determination means 32 sends, to the display control means 31, a signal indicating that it is not possible to receive any signal.

Further, the recognition information detecting means 33 detects the recognition information signal from the received signal, and determines whether or not the recognition information signal is identical to the recognition information signal set in the ROM 16 or the like. Then, in cases where the detected recognition information signal is different from the set recognition information signal, the recognition information detecting means 33 sends, to the display control means 31, a signal indicating that other communication device, which transmits a different recognition information signal, is present near here.

Thus, the display control means 31 prepares a display screen image in accordance with each of the signals respectively transmitted from the determination means 32, the recognition information detecting means 33, and jamming signal detection means 34.

The display control means 31 extracts one of the plurality of poor reception information that are based on the display information, such as the character pattern, which is stored in the storage means such as the ROM 16 and which indicates that it is not possible to receive any signal. Then, the display control means 31 sends, to the image processing means 11, a signal causing the extracted poor reception information to be displayed. The display screen image indicating the extracted poor reception information will be specifically described later.

Figure 3:
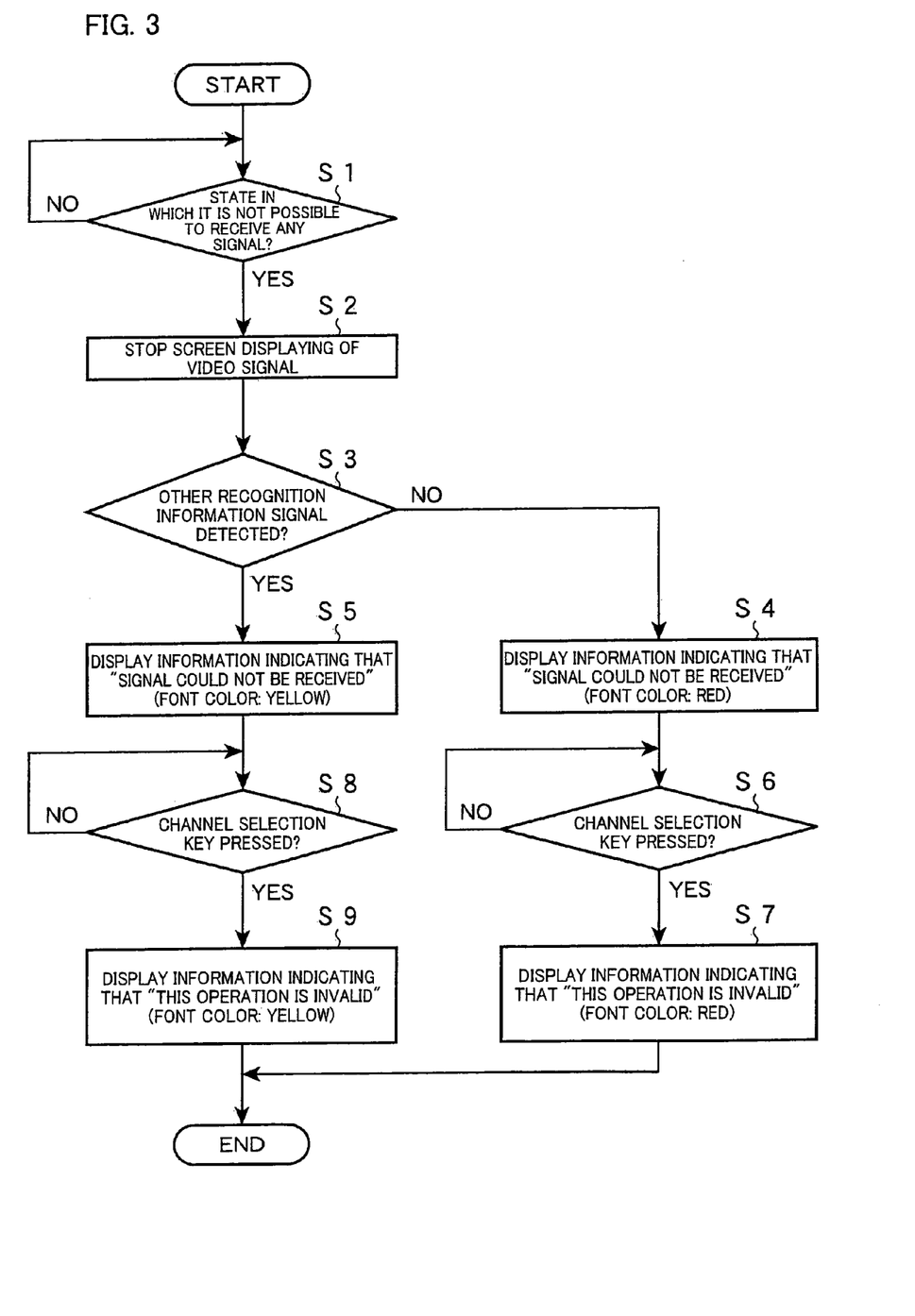
FIG. 3 is a flowchart concerning display control carried out in cases where a signal cannot be received in the wireless transmitting and receiving system according to the embodiment of the present invention.

The display control, carried out when it is not possible to receive any signal, of the present invention will be described with reference to (i) a block diagram shown in FIG. 1, (ii) a block diagram shown in FIG. 2, and (iii) a flow chart shown in FIG. 3.

First, in cases where a video signal transmitted from the wireless transmitting apparatus A cannot be normally received by the display apparatus B (S1), the display apparatus B stops displaying that is based on the received video signal (S2). On this occasion, the determination means 32 shown in FIG. 1 determines whether it is not possible to receive any signal. In accordance with the determination, the display control means 31 sends, to the image processing means 13, a control signal for stopping the display.

Next, the microcomputer 15 detects whether other recognition information signal than the set recognition information signal exists (S3). On this occasion, the recognition information detecting means 33 shown in FIG. 1 detects whether other recognition information signal exists, under the state in which it is not possible to receive any signal.

Figure 4:
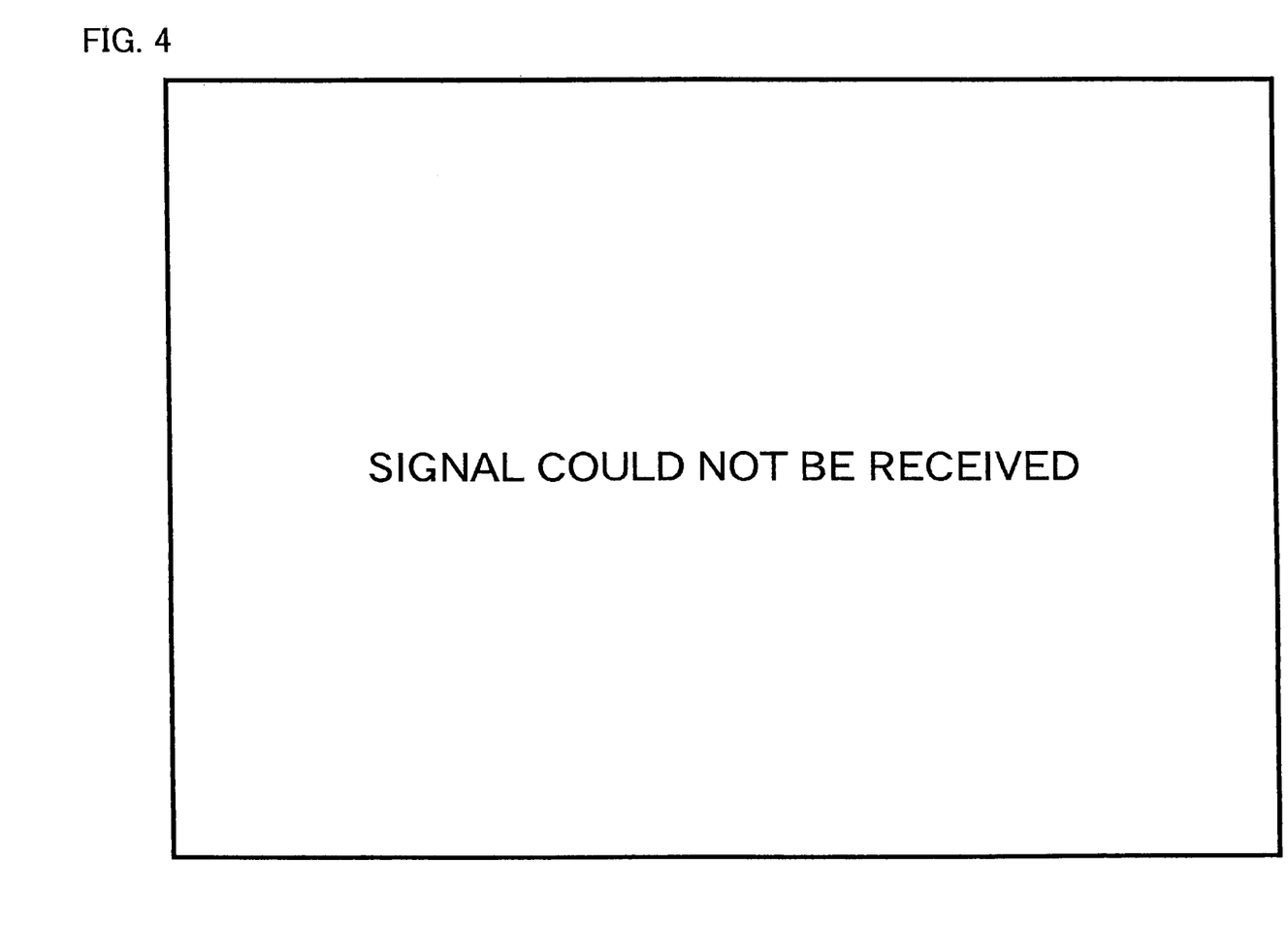
FIG. 4 is a diagram showing a display screen image indicating "SIGNAL COULD NOT BE RECEIVED".

In cases where other recognition information signal is not detected in S3, it is determined that a state in which it is not possible to receive any signal is not caused by the presence of a communication device transmitting a different recognition information signal. Then, the display means 12 carries out a display, for example in red, indicating that "it is not possible to receive any signal" (FIG. 4 shows an example of such a display, and the example indicates that "SIGNAL COULD NOT BE RECEIVED") (S4). On this occasion, in accordance with a detected signal transmitted from the recognition information detecting means 32, the display control means 31 has detected other recognition information signal. However, the image processing means 11 receives a control signal causing the display means 12 to carry out a display (display of the content shown in FIG. 4 in red) indicating that it is not possible to receive any signal.

On the other hand, in cases where other recognition information signal has been detected in S3, it is determined that the reason why it is not possible to receive any signal resides in a jamming radio wave transmitted from a communication device which transmits other recognition information signal. The display means 12 carries out a display, for example in yellow, indicating that "it is not possible to receive any signal", as shown in FIG. 4 (S5). On this occasion, in accordance with a detected signal transmitted from the recognition information detecting means 33, the display control means 31 has detected other recognition information signal. However, the image processing means 11 receives a control signal causing the display means 12 to carry out a display (display of the content shown in FIG. 4 in yellow) indicating that "it is not possible to receive any signal".

Thus, the display, carried out when it is not possible to receive any signal, is made in the different colors. This allows the user to recognize the reasons why it is not possible to receive any signal. The colors of the display are not limited to the above two colors. Instead of changing colors, a display may be carried out by changing display formats or by changing character styles, sizes, or the like. Further, the display, indicating that "it is not possible to receive any signal", may be carried out by other displaying means (not shown), not by the display means 12. This point will be described later.

In cases where other recognition information signal has been detected, it may be of course possible for the content of display to be changed to a content of display indicating that "it is not possible to receive any signal, because other SS wireless transmitter exists". However, in cases where the content of display is changed, it is necessary to secure a memory capacity for storing the different content of display. Note that if a content of display is changed by changing display formats such as colors, character styles, or sizes, then it is not necessary to secure a separate memory capacity. This is because such content of display can be changed simply by changing, with the use of a character generator of the microcomputer 15 or the like, the set values concerning the colors, character styles, or sizes of the content of display.

The following explains a case in which an operation such as a channel selecting operation is carried out with the use of operation means such as the remote controller 17 while it is not possible to receive any signal.

In cases where no other recognition information signal has been detected as in S4, when the user carries out an operation by pressing a channel selection key or the like (S6), such an operation is invalidated. Then, a display indicating that "it is not possible to receive any signal" and a display indicating that "such an operation is invalid" are both carried out in red (FIG. 5 shows an example in which "THIS OPERATION IS INVALID" is displayed in addition to "SIGNAL COULD NOT BE RECEIVED") (S7).

On the other hand, in cases where other recognition information signal has been detected, when the user carries out an operation by pressing the channel selection key or the like (S8) as in S6, such an operation is invalidated. Then, a display indicating that "it is not possible to receive any signal" and a display indicating that "such an operation is invalid" are both carried out in yellow (FIG. 5 shows the example in which "THIS OPERATION IS INVALID" is displayed in addition to "SIGNAL COULD NOT BE RECEIVED") (S9).

Thus, as with the display indicating that "it is not possible to receive any signal", it is also possible for the user to know the reason why the operation is invalid, by changing display format of a display, indicating that the operation is invalid, in accordance with the reasons why it is not possible to receive any signal. Further, it may be possible to change the content of display in accordance with the reasons why it is not possible to receive any signal. In cases where a display indicating that "it is not possible to receive any signal" and a display indicating that "the operation is invalid" are both carried out as shown in FIG. 5, it is not always necessary for the display indicating that "the operation is invalid" to change in the display format and/or the content of display. This is because a specific reason is identified by (i) the format and/or (ii) the content of a display indicating that "it is not possible to receive any signal". Further, as with the display information indicating that "it is not possible to receive any signal", the display information, such as a character pattern, which indicates that "the operation is invalid" is stored in the storage means such as the ROM 16. Each of the display information may of course be stored in separate storage means.

Figure 5:
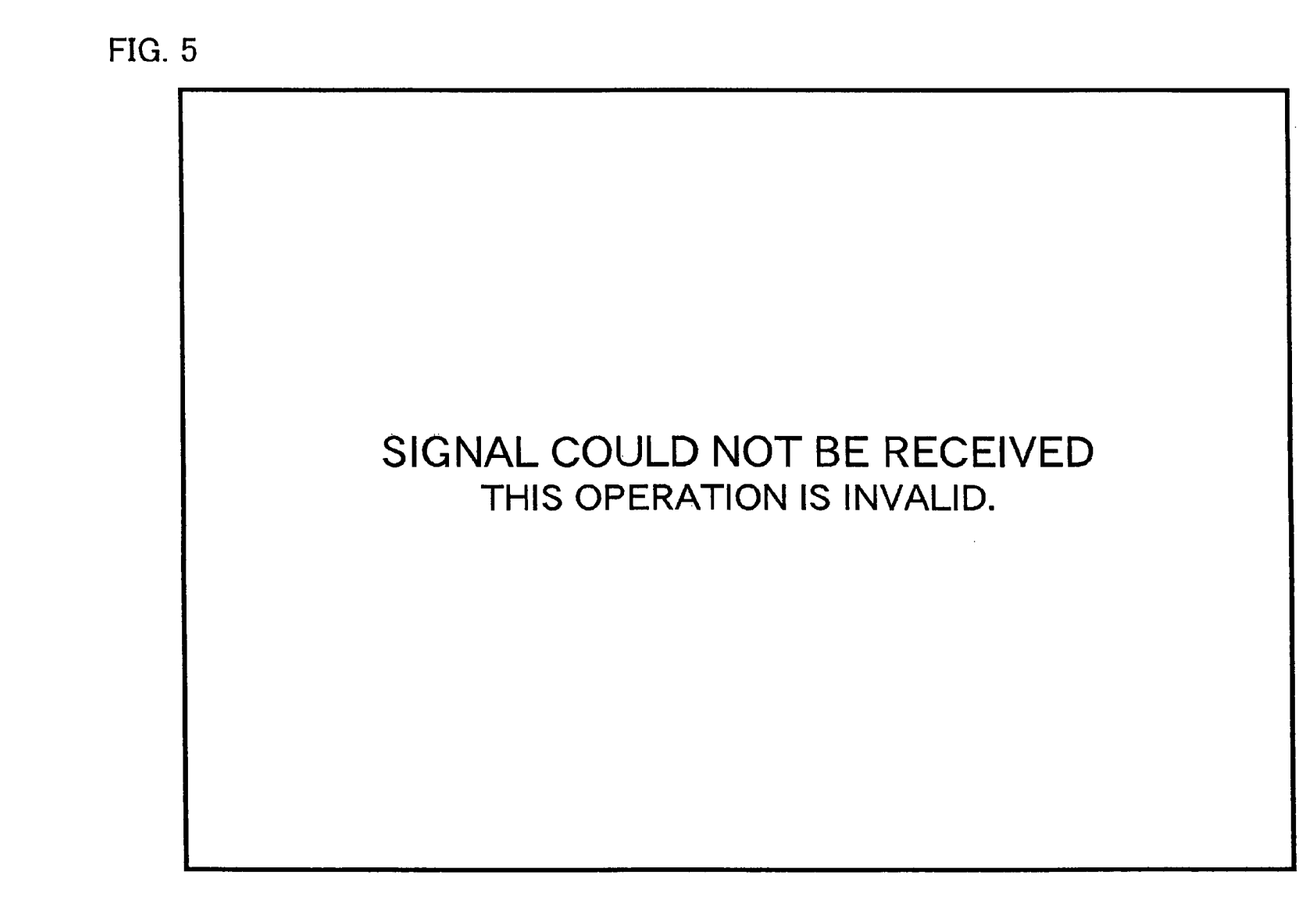
FIG. 5 is a diagram showing a display screen image indicating "THIS OPERATION IS INVALID".

Although FIG. 5 shows an example in which a display indicating that "it is not possible to receive any signal" and a display indicating that "the operation is invalid" are both carried out. It may be arranged so that (i) a display indicating that "the operation is invalid" is carried for a predetermined period of time, when the operation is made, and then (ii) a display, as shown in FIG. 4, indicating that "it is not possible to receive any signal" is resumed.

Examples of the operation that is to be invalidated include an operation, such as a channel selecting operation, which requires a transmitting to be carried out from the display apparatus B to the wireless transmitting apparatus A.

As described above, the present embodiment uses the display means 12 to display the information to show at the time when the video signal has become unable to be received. However, the information, to show at the time when the video signal has become unable to be received, may be displayed by the display means different from the display means 12 for displaying an image.

That is, the display means 12 is not the only means for displaying (i) the jamming signal information and/or (ii) the information which informs the presence of a different SS wireless communication device. Alternative means is, for example, means for informing the user of (i) the jamming signal information or (ii) the information indicative of the presence of a different SS wireless communication device by carrying out an output controlling at an output terminal which ordinarily outputs received image information to an externally connected display device, such that those information are outputted to and displayed on a screen of other display device.

Such an arrangement will be specifically described below with reference to a block diagram shown in FIG. 6.

Figure 6:
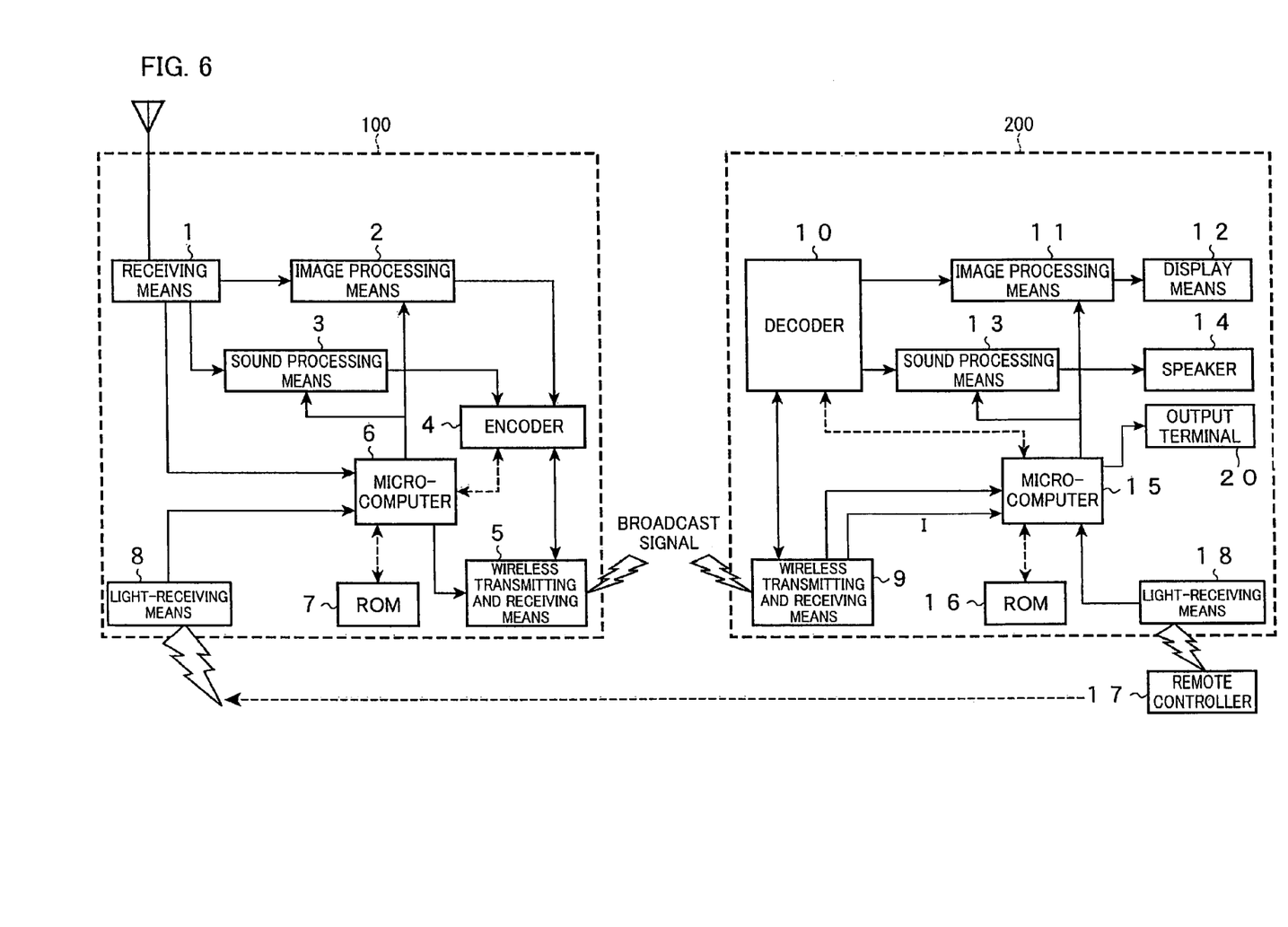
FIG. 6 is a block diagram showing a wireless transmitting and receiving system according to another embodiment of the present invention.

FIG. 6 is the block diagram showing a wireless transmitting and receiving system including a display unit 200 which has an image output terminal 20 separately from the display means 12. An image transmission unit 100 is arranged in the same manner as the wireless transmitting apparatus A of the wireless transmitting and receiving section shown in FIG. 2, and therefore detail description will be omitted. Further, the display unit 200 is arranged in the same manner as the display apparatus B of the wireless transmitting and receiving system of FIG. 2, except that the display unit 200 is provided with the output terminal 20, and therefore detail description will be omitted.

The wireless transmitting and receiving system shown in FIG. 6 is arranged as follows. Specifically, in cases where either the wireless transmitting and receiving means 5 of the image transmission unit 100 or the wireless transmitting and receiving means 9 of the display unit 200 detects either the presence of a different SS wireless device or a jamming radio wave, the microcomputer 15 of the display unit 200 (i) reads out, from the ROM 16, either the jamming signal information or the information informing the presence of a different SS wireless communication device, and (ii) carries out such a control at the image output terminal 20 of the display unit 200 that an information display process is carried out with respect to the information thus read out. In the information display process, the above information is superimposed onto another image signal (e.g., a single uniform pattern signal such as a black screen which is outputted instead of a received video signal that is not accurately displayed).

That is, the display control means 31 (see FIG. 1) provided in the microcomputer 15 of the display unit 200 is arranged so as to supply the control signal to the output terminal 20 instead of the image processing means 11 for the purpose of causing the display means different from the display means 12 to display the poor signal reception information.

With this arrangement, it is possible to prevent an unviewable image from being provided to the user. Moreover, with this arrangement, by switching between the display means, it is possible to adequately inform the user and a service person of whether it is not possible to receive any signal by either the presence of the jamming electric wave or the presence of the different SS wireless device.

As described above, in cases where the video signal cannot be normally received, the display apparatus of the foregoing arrangement can display information which makes it possible to recognize whether the video signal cannot be normally received due to the presence of the different wireless communication device. This makes it possible to easily find out how to deal with the case where it is not possible to receive a signal.

The present invention is not limited to the description of the embodiments above, but may be altered by a skilled person within the scope of the claims. An embodiment based on a proper combination of technical means disclosed in different embodiments is encompassed in the technical scope of the present invention.

Operating means such as a CPU executes a program stored in storage means such as a ROM (read only memory) and a RAM (random access memory) so as to control input means (e.g., a keyboard), output means (e.g., a display), or communication means (e.g., an interface circuit). In this way, the members and processes of the display apparatus of the foregoing embodiment are achieved and executed. Therefore, the foregoing various functions and processes of the detecting apparatus of the present embodiment can be achieved by simply causing a computer having these means to read and execute the program stored in a computer-readable recording medium. Further, by storing the program in a removable computer-readable recording medium, the various functions and processes can be achieved on any computer.

Such a computer-readable recording medium may be a memory (not shown), such as a ROM, so that the process is executable on a microcomputer. Alternatively, a program medium may be used which can be read by inserting the computer-readable recording medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a computer-readable recording medium arranged so that it can be separated from the main body. Examples of such a computer-readable recording medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

INDUSTRIAL APPLICABILITY

The present invention makes it possible to determine why it is not possible to receive a signal in a wireless transmitting and receiving system, and therefore can be applied in general to a device capable of transmitting and receiving a radio signal.

The invention claimed is:

1. A display apparatus for wirelessly receiving at least (i) a recognition information signal for determining whether or not the display apparatus is identified with a wireless transmitting apparatus and (ii) a video signal, the display apparatus, comprising:

wireless receiving means for receiving the recognition information signal and the video signal that are wirelessly transmitted;

detecting means for carrying out detection of the recognition information signal;

display means for displaying an image in accordance with at least the video signal;

storage means for storing display information indicating that it is not possible to receive a signal; and display control means for, when the video signal is not normally received, causing the display means to display one of a plurality of poor reception information that are retrieved from the stored display information, wherein when the detecting means detects another recognition information signal that is different from a recognition information signal set in the display apparatus, the display control means causes the display means to display first poor reception information, and when the detecting means does not detect said another recognition information signal, the display control means causes the display means to display second poor reception information that is different from the first poor reception information.

2. The display apparatus as set forth in claim 1, wherein:

the first poor reception information and the second poor reception information are displayed in different display formats.

3. The display apparatus as set forth in claim 1, further comprising:

operation means for carrying out an operation with respect to the display apparatus; and said storage means storing display information indicating that the operation is invalid, wherein:

when the operation means carries out the operation under a state in which the video signal is not normally received, the display control means (i) invalidates the operation and (ii) causes the display means to display one of a plurality of invalid operation information that are based on the display information indicating that the operation is invalid.

4. The display apparatus as set forth in claim 3, wherein: the invalid operation information of which the display control means causes a display differs according to the result of the detection carried out by the detecting means.

5. The display apparatus as set forth in claim 4, wherein: when the detecting means detects said another recognition information signal that is different from the recognition information signal set in the display apparatus, the display control means causes the display means to display first invalid operation information; and when the detecting means does not detect said another recognition information signal, the display control means causes the display means to display second invalid operation information that is different from the first invalid operation information.

6. The display apparatus as set forth in claim 5, wherein: the first invalid operation information and the second invalid operation information are displayed in the different display formats.

7. A wireless transmitting and receiving system for wirelessly transmitting and receiving at least (i) a recognition information signal for identifying the wireless transmitting and receiving system and (ii) a video signal, the wireless transmitting and receiving system, comprising:

a wireless transmitting apparatus for wirelessly transmitting the recognition information signal and the video signal; and a display apparatus, which includes:

wireless receiving means for receiving the recognition information signal and the video signal;

detecting means for carrying out detection of the recognition information signal;

display means for displaying an image in accordance with at least the video signal;

storage means for storing display information indicating that it is not possible to receive a signal; and display control means for, when the video signal is not normally received, causing the display means to display one of a plurality of poor reception information that are based on the display information, wherein when the detecting means detects another recognition information signal that is different from the recognition information signal transmitted from the wireless transmitting apparatus, the display control means causes the display means to display first poor reception information, and when the detecting means does not detect said another recognition information signal, the display control means causes the display means to display second poor reception information that is different from the first poor reception information.

8. The wireless transmitting and receiving system as set forth in claim 7, wherein:

the first poor reception information and the second poor reception information are displayed in different display formats.

9. The wireless transmitting and receiving system as set forth in claim 7, further comprising:

operation means for carrying out an operation with respect to the display apparatus; and said storage means storing display information indicating that the operation is invalid, wherein:

when the operation means carries out the operation under a state in which the video signal is not normally received, the display control means (i) invalidates the operation and (ii) causes the display means to display one of a plurality of invalid operation information that are based on the display information indicating that the operation is invalid.

10. The wireless transmitting and receiving system as set forth in claim 9, wherein:

the operation invalid information of which the display control means causes a display differs according to a result of the detection carried out by the detecting means.

11. The wireless transmitting and receiving system as set forth in claim 10, wherein:

when the detecting means detects said another recognition information signal that is different from the recognition information signal transmitted from the wireless transmitting apparatus, the display control means causes the display means to display first invalid operation information; and when the detecting means does not detect said another recognition information signal, the display control means causes the display means to display second invalid operation information that is different from the first invalid operation information.

12. The wireless transmitting and receiving system as set forth in claim 11, wherein:

the first invalid operation information and the second invalid operation information are displayed in the different display formats.

* * * * *